(12) United States Patent
Kashihara

(10) Patent No.: US 8,709,253 B2
(45) Date of Patent: Apr. 29, 2014

(54) SEPARATION MEMBRANE ELEMENTS, SEPARATION MEMBRANE MODULE, AND PROCESS FOR PRODUCING SEPARATION MEMBRANE ELEMENT

(75) Inventor: Hideki Kashihara, Osaka (JP)

(73) Assignee: Sumitomo Electric Industries, Ltd., Osaka-shi, Osaka (JP)

( * ) Notice: Subject to any disclaimer, the term of this patent is extended or adjusted under 35 U.S.C. 154(b) by 509 days.

(21) Appl. No.: 12/811,913

(22) PCT Filed: Jan. 9, 2009

(86) PCT No.: PCT/JP2009/050219
§ 371 (c)(1),
(2), (4) Date: Jul. 7, 2010

(87) PCT Pub. No.: WO2009/088075
PCT Pub. Date: Jul. 16, 2009

(65) Prior Publication Data
US 2010/0276355 A1    Nov. 4, 2010

(30) Foreign Application Priority Data

Jan. 11, 2008  (JP) .................................. 2008-004171
Feb. 28, 2008  (JP) .................................. 2008-047481

(51) Int. Cl.
*B01D 63/02*   (2006.01)
*B01D 67/00*   (2006.01)
*B01D 69/08*   (2006.01)
*B01D 71/32*   (2006.01)
*B29C 39/22*   (2006.01)
*B29C 39/10*   (2006.01)

(52) U.S. Cl.
USPC ................. 210/321.89; 210/500.23; 264/129; 264/139; 264/154

(58) Field of Classification Search
USPC ......... 210/321.89, 500.23; 264/154, 129, 135
See application file for complete search history.

(56) References Cited

U.S. PATENT DOCUMENTS 6,168,648 B1 *   1/2001   Ootani et al. ..................... 95/46

FOREIGN PATENT DOCUMENTS

JP           61-157307           7/1986
(Continued)

OTHER PUBLICATIONS

English translation Japanese Patent No. 3-978983 (Sep. 2007).*

*Primary Examiner* — John Kim
(74) *Attorney, Agent, or Firm* — Drinker Biddle & Reath LLP

(57) ABSTRACT

The invention offers a separation membrane element that can be produced by a method in which a membrane-sealing portion is formed by, first, immersing end portions of hollow-fiber-shaped porous separation membranes in a resinous liquid and, then, curing the resin, that has a feature in that the membrane-sealing portion is formed of a casting resin and pores of the hollow-fiber-shaped porous separation membranes are filled with a pore-filling resin at the portion at which the membranes are in contact with the membrane-sealing portion, so that the casting resin is strongly bonded with the pore-filling resin, and that has the hollow-fiber-shaped porous separation membranes whose basal portions are flexible, so that breakage of the basal portions and leakage of gas or liquid are less likely to occur when in use; a separation membrane element that has a feature in that in the membrane-sealing portion, at least the surface at a side that is to be in contact with a liquid to be treated is formed of a thermosetting fluororesin, so that the membrane-sealing portion has excellent chemical resistance comparable to that of the conventional membrane-sealing portion formed of a thermoplastic fluororesin; separation membrane modules having these separation membrane elements as constituting elements; and a method of producing the separation membrane element.

14 Claims, 3 Drawing Sheets

(56) References Cited

FOREIGN PATENT DOCUMENTS

| JP | 61-157309 | 7/1986 |
| JP | 3-106422 | 5/1991 |
| JP | 4-4024 | 1/1992 |
| JP | 6-296836 | 10/1994 |
| JP | 08-010582 A | 1/1996 |
| JP | 9-290138 | 11/1997 |
| JP | 2000-229225 | 8/2000 |
| JP | 2001-300265 | 10/2001 |
| JP | 2002-011331 A | 1/2002 |
| JP | 2003-93850 | 4/2003 |
| JP | 2003-112016 | 4/2003 |
| JP | 3-978983 B2 * | 9/2007 |

* cited by examiner

SEPARATION MEMBRANE ELEMENTS, SEPARATION MEMBRANE MODULE, AND PROCESS FOR PRODUCING SEPARATION MEMBRANE ELEMENT

TECHNICAL FIELD

The present invention relates to a separation membrane element incorporating hollow-fiber-shaped porous separation membranes; to a separation membrane module that has the separation membrane element as a constituting element and that is to be used for gas-liquid absorption, degasification, filtration, and so on in the field of semiconductor production, food-products industry, and the like; and to a method of producing the separation membrane element.

BACKGROUND ART

In the field of semiconductor production, food-products industry, and the like, the process of gas-liquid absorption, degasification, filtration, and so on uses a separation membrane module that houses in its housing a separation membrane element incorporating hollow-fiber-shaped porous separation membranes. The separation membrane element is formed by bundling a plurality of hollow-fiber-shaped porous separation membranes together and by sealing end portions of the membranes using a membrane-sealing portion made of resin to unite the membranes with the membrane-sealing portion.

The sealing of the hollow-fiber-shaped porous separation membranes in the production of the separation membrane element is conventionally performed by the following process. First, the end portions of the hollow-fiber-shaped porous separation membranes are set in a mold. Second, a resinous liquid (which means a resin in a liquid state, and the same is applied to the following explanation) is cast into the mold to immerse the end portions of the hollow-fiber-shaped porous separation membranes in the resinous liquid. Finally, the resinous liquid is cured to form the membrane-sealing portion. (Hereinafter, the foregoing process is sometimes referred to as the immersion forming process.) FIG. 3 is a sectional view showing a condition of the above-described casting (immersion). In FIG. 3, the sign 35 indicates one of the hollow-fiber-shaped porous separation membranes, and the sign 35' indicates the hollow portion of the membrane. FIG. 3(a) shows a condition in which an end portion 32 of the hollow-fiber-shaped porous separation membrane 35 is immersed in a resinous liquid 33 that is cast in the mold (not shown).

When the casting (immersion) is performed, the opening of the hollow portion at the end of the hollow fiber is closed by a method of sealing, tying together with other hollow fibers, or the like in advance to prevent the resin from flowing into the hollow portion of the hollow fiber (hereinafter, the closed portion is referred to as the opening-closed portion). After the curing of the resin, the end portion of the hollow fiber is severed together with the cured resin (the resin's portion in the vicinity of the end portion of the hollow fiber) to expose at the end the opening of the hollow portion. The sign 34 in FIG. 3(a) indicates the opening-closed portion at the end of the hollow fiber. FIG. 3(b) shows a condition in which the opening-closed portion 34 at the end of the hollow fiber is severed together with the cured resin in its vicinity (the portion enclosed by the frame "m" in FIG. 3(a)). Thus, the membrane-sealing portion is formed in which the opening of the hollow portion 35 is exposed.

According to the immersion forming process, the membrane-sealing portion can be formed through only a few steps. Therefore, this process is desirable in view of the productivity. In this process, when the hollow-fiber-shaped porous separation membrane is immersed in the resinous liquid, the resinous liquid 33 penetrates into numerous fine pores in the end portion 32 of the hollow-fiber-shaped porous separation membrane (the individual pores are not shown). By curing the cast resinous liquid 33 and the pore-filling resinous liquid 33, an anchoring effect is exerted between the resinous liquids. This anchoring effect improves the bonding ability between the hollow-fiber-shaped porous separation membrane and the membrane-sealing portion, enabling the two members to unite reliably (Patent Literature 1).

As the material for constituting this type of separation membrane module, it is desired to use a material having chemical resistance because the module sometimes treats corrosive gas or liquid. For example, a porous fluororesin, which has high chemical resistance, is widely used for the material of the hollow-fiber-shaped porous separation membranes. In addition, the membrane-sealing portion is also desired to be formed of a material having high chemical resistance because it is used in contact with the gas and liquid to be treated.

The membrane-sealing portion is conventionally formed of urethane resin or epoxy resin. However, these resins have lower chemical resistance than that of fluororesin. Consequently, there has been a problem in that when corrosive gas or liquid is treated, the membrane-sealing portion tends to deteriorate due to the contact with the gas or liquid to be treated at the time the separation membrane module is used. To solve the problem, engineers have proposed the use of thermoplastic fluororesin, which is a material having high chemical resistance, such as a tetrafluoroethylene/perfluoro (alkyl vinyl ether) copolymer (PFA) (Patent Literature 2).

Patent Literature 1: the published Japanese patent application Tokukaihei 3-106422

Patent Literature 2: the published Japanese patent application Tokukaihei 9-290138.

DISCLOSURE OF THE INVENTION

Problem to be Solved by the Invention

Despite the above description, the above-described conventional technique has the problems described below.

In the immersion forming process, which is a process as shown in FIG. 3 (the process in which after the end portion of the hollow-fiber-shaped porous separation membrane is immersed in the resinous liquid, the resin is cured to form the membrane-sealing portion), at the time of the immersion, the resinous liquid 33 rises due to the capillary phenomenon to the hollow-fiber-shaped porous separation membrane's basal portion 32a, whose height is higher than that of the surface of the resinous liquid 33. As a result, the curing of the resinous liquid 33 absorbed into the basal portion 32a causes the basal portion 32a to lose its flexibility.

When the separation membrane element (the separation membrane module) is used, fluctuations in the flow rate, the pressure, and the like of the gas or liquid to be treated cause the hollow-fiber-shaped porous separation membrane to oscillate, thereby exerting bending stress and the like to the basal portion 32a of the hollow-fiber-shaped porous separation membrane. In this case, there has been a problem in that when the basal portion 32a loses its flexibility, this bending stress and the like result in breakage of the basal portion 32a, creating leakage of the gas or liquid.

Furthermore, there has been the below-described problem in the use of a thermoplastic fluororesin, such as PFA, as the material for forming the membrane-sealing portion.

Fluororesin, for example, a thermoplastic fluororesin, such as PFA, has a high melting point, and even when it is melted, it has extremely high viscosity, so that it is necessary to heat it to 300° C. or more to obtain fluidity for the forming. At such a high temperature, the hollow-fiber-shaped porous separation membranes will melt. Therefore, the fluororesin cannot be cast as the resinous liquid into the mold into which the hollow-fiber-shaped porous separation membranes are set. Consequently, it has been difficult to employ the immersion forming process employed in the case where urethane resin or epoxy resin is used.

To solve the foregoing problem, the following method has been proposed. After the forming of the membrane-sealing portion, a hole is drilled in the membrane-sealing portion. The end portions of the hollow-fiber-shaped porous separation membranes are inserted into the hole. Then, heating is performed to fusion-bond the hollow-fiber-shaped porous separation membranes and the membrane-sealing portion so that the two members can be united. Nevertheless, this method has a problem of low productivity because the production steps of the separation membrane element are significantly increased. Furthermore, this method has another problem in that hollow-fiber-shaped porous separation membranes are apt to be detached from the membrane-sealing portion when in use because the anchoring effect cannot be expected, so that the bonding ability between the two members is low.

The present invention is made in view of the above-described problems in the prior art, and the problems to be solved by the present invention are shown in items (1) and (2) below.

(1) The present invention offers a separation membrane element that has hollow-fiber-shaped porous separation membranes whose basal portions are flexible, so that the breakage of the basal portions and the leakage of the gas or liquid are less likely to occur when in use although the element can be produced through the immersion forming process, in which after the end portions of the hollow-fiber-shaped porous separation membranes are immersed in a resinous liquid, the resin is cured to form the membrane-sealing portion; a method of producing the separation membrane element; and a separation membrane module having the separation membrane element as a constituting element (Problem 1).

(2) The present invention offers a separation membrane element that can be produced through the immersion forming process as in the case where urethane resin or epoxy resin is used and that consequently not only has high productivity and excellent bonding ability between the membrane-sealing portion and the end portions of the hollow-fiber-shaped porous separation membranes but also has the membrane-sealing portion having excellent chemical resistance comparable to that of the conventional membrane-sealing portion made of thermoplastic fluororesin; a method of producing the separation membrane element; and a separation membrane module having the separation membrane element as a constituting element (Problem 2).

Means for Solving the Problem

The present inventor has intensely studied to solve Problem 1 described above and has found that Problem 1 described above can be solved by causing a cured body of resin to fill only the pores at the portions where the end portions of the hollow-fiber-shaped porous separation membranes are in contact with the membrane-sealing portion. Thus, an invention having a constitution described below has been completed (hereinafter, the invention is sometimes referred to as Invention 1).

The invention as defined by claim 1 is a separation membrane element having a plurality of hollow-fiber-shaped porous separation membranes and a membrane-sealing portion that bundles end portions of the hollow-fiber-shaped porous separation membranes together to seal the end portions, the element having a feature in that:

(a) the membrane-sealing portion is formed of a casting resin, and (b) pores in the hollow-fiber-shaped porous separation membranes are filled with a pore-filling resin at portions where the hollow-fiber-shaped porous separation membranes are in contact with the membrane-sealing portion, so that the casting resin is bonded with the pore-filling resin.

The invention corresponds to Invention 1.

The basis that the separation membrane element as defined by claim 1 has a plurality of hollow-fiber-shaped porous separation membranes and a membrane-sealing portion that bundles end portions of the hollow-fiber-shaped porous separation membranes together to seal the end portions is the same as that of the conventional separation membrane element used for gas-liquid absorption, degasification, filtration, and so on in the field of semiconductor production, food-products industry, and the like. In addition, the shape and material of the hollow-fiber-shaped porous separation membranes, the number of membranes, the shape of the membrane-sealing portion, and the like can be the same as those of the conventional separation membrane element.

In the above description, the individual hollow-fiber-shaped porous separation membrane is a porous separation membrane having the shape of a fine tube, and the porous separation membrane is a membrane, particularly a resinous membrane, having a large number of fine pores, particularly through holes that penetrate through between both surfaces of the membrane. Filtration, contact between gas and liquid, degasification, and so on are performed between the inner side and outer side of the tube of the hollow-fiber-shaped porous separation membrane through the above-described through holes.

The membrane-sealing portion is a portion that bundles end portions of the multiple hollow-fiber-shaped porous separation membranes together to seal the end portions. Usually, the membrane-sealing portion is provided at both ends of the hollow-fiber-shaped porous separation membranes. The membrane-sealing portion, also, is formed of a cured body of resin as with the conventional method. Furthermore, the basis that the membrane-sealing portion can be formed by performing the following steps (1) to (3) in succession is the same as that of the conventional method:

(1) setting the end portions of the hollow-fiber-shaped porous separation membranes in a mold, (2) casting a resinous liquid into the mold, and (3) curing the resin in the resinous liquid.

Usually, to prevent the resinous liquid from entering the hollow portions of the hollow-fiber-shaped porous separation membranes, the following steps are further performed: before the step (1), a step of closing the openings of the hollow portions at the end of the hollow-fiber-shaped porous separation membranes by sealing, tying together, or another method, and after the step (3), a step of exposing the openings of the hollow portions by severing the end portions of the hollow fibers together with a part of the cured resin.

The above-described term "casting resin" means a cured body of the resin that forms the resinous membrane-sealing portion. A cured body of a thermosetting resin that facilitates the forming by the casting and curing is desirably used. Consequently, as the foregoing resinous liquid, a thermosetting resin in a liquid state, which is uncured, is desirably used.

The separation membrane element as defined by claim 1 has a feature in that the pores in the hollow-fiber-shaped porous separation membranes are filled with resin practically only at the contact portion at which the hollow-fiber-shaped porous separation membranes are brought into contact with the membrane-sealing portion. The term "pore-filling resin" means a resin that fills the pores. The pores existing at the portion other than the contact portion are not filled with the pore-filling resin. In other words, unlike the conventional separation membrane element, at the basal portions of the hollow-fiber-shaped porous separation membranes (32a in FIG. 3, for example), there is almost no existence of a portion at which the flexibility is lost due to the hardening caused by the impregnation with the resin. This feature suppresses the breakage of the basal portions and the leakage of gas or liquid resulting from the oscillation of the hollow-fiber-shaped porous separation membranes.

In the above description, the pores in the hollow-fiber-shaped porous separation membranes are the above-described through holes and other minute holes both included in the hollow-fiber-shaped porous separation membranes. The term "contact portion" means not only the hollow-fiber-shaped porous separation membranes' portion that is implanted in the membrane-sealing portion (i.e., the portion under the surface of the casting resinous liquid when the casting is performed) but also the portion in the vicinity of the implanted portion (the portion slightly above the foregoing surface of the resinous liquid). Nevertheless, to more effectively prevent the breakage of the basal portions and the leakage of gas or liquid, it is not only desirable that only the pores existing at the implanted portion be filled with the pore-filling resin but also desirable that the foregoing portion in the vicinity of the implanted portion be as small as possible.

In addition, the separation membrane element as defined by claim 1 has a feature in that at the contact portion, the pore-filling resin is strongly bonded with the casting resin that constitutes the membrane-sealing portion. Because the pore-filling resin is strongly bonded (welded, for example) with the casting resin, the hollow-fiber-shaped porous separation membranes are strongly bonded with the membrane-sealing portion.

The invention as defined by claim 2 is the separation membrane element as defined by claim 1, the element having a feature in that the casting resin and the pore-filling resin are each a cured body of a thermosetting resin. As described above, as the casting resin, a cured body of a thermosetting resin is desirably used. The pore-filling resin is not particularly limited on condition that it maintains the solid state and does not suffer from deterioration in the environment in which the separation membrane element (separation membrane module) is used. Nevertheless, a thermosetting resin is desirable because it facilitates the filling into the pores of the hollow-fiber-shaped porous separation membranes. In other words, first, the end portions of the hollow-fiber-shaped porous separation membranes are immersed in the resinous liquid, which is uncured, to fill the pores with the resinous liquid. Then, the pore-filling resinous liquid is cured. Thus, the filling operation can be conducted easily. This is the reason why the thermosetting resin is desirable.

The invention as defined by claim 3 is the separation membrane element as defined by claim 1 or 2, the element having a feature in that the casting resin and the pore-filling resin are the same type of resins. In this description, the term "the same type of resins" means, for example, resins having the same chemical composition or closely resembling chemical compositions. More specifically, the term means resins having a mutual relationship such that when one of them is an epoxy resin, the other is also an epoxy resin (a more desirable case is such that when one of them is a bisphenol A-type epoxy resin, the other is also a bisphenol A-type epoxy resin) different only in molecular weight. When the casting resin and the pore-filling resin are the same type of resins, the hollow-fiber-shaped porous separation membranes are more strongly bonded with the membrane-sealing portion. This feature can suppress troubles such as the pulling-out of a hollow-fiber-shaped porous separation membrane when in use.

The invention as defined by claim 4 is the separation membrane element as defined by any one of claims 1 to 3, the element having a feature in that the casting resin has a hardness of 40 degrees or more and the pore-filling resin has a hardness lower than that of the casting resin. To secure the mechanical strength of the membrane-sealing portion, such as resistance to pressure, and to decrease the frequency of troubles such as the pulling-out of a hollow-fiber-shaped porous separation membrane, it is desirable that the casting resin have high hardness. More specifically, it is desirable that the casting resin have a hardness of 40 degrees or more.

In the above description, the hardness is the value measured by a method in conformity with testing methods for durometer hardness of plastics stipulated in JIS K 7215.

On the other hand, to prevent the breakage of the basal portions and the leakage of gas or liquid resulting from the oscillation of the hollow-fiber-shaped porous separation membranes, it is desirable that the pore-filling resin be flexible and have low hardness. In particular, when the casting resin has a hardness of 40 degrees or more, the hard casting resin causes the hollow-fiber-shaped porous separation membranes to be apt to tear when the membranes oscillate. Consequently, it is desired to use a soft pore-filling resin to prevent the tearing of the hollow-fiber-shaped porous separation membranes at the time of the oscillation. Therefore, it is desirable that the pore-filling resin have a hardness lower than that of the casting resin. The invention as defined by claim 4 corresponds to the above-described desirable embodiment.

The invention as defined by claim 5 is the separation membrane element as defined by any one of claims 1 to 3, the element having a feature in that the casting resin has a hardness of less than 40 degrees and the pore-filling resin has the same hardness as or a hardness lower than that of the casting resin. Even when the casting resin has a hardness of less than 40 degrees, to prevent the breakage of the basal portions and the leakage of gas or liquid resulting from the oscillation of the hollow-fiber-shaped porous separation membranes, it is desirable that the pore-filling resin have the same hardness as or a hardness lower than that of the casting resin.

The separation membrane element as defined by claim 1 can be produced through the method described below. First, end portions of the multiple hollow-fiber-shaped porous separation membranes are impregnated with a solution of a thermosetting resin. Then, the impregnating resinous solution is dried to form resin-impregnated portions. A thermosetting resin in a liquid state, which is uncured, is cast into a mold. The resin-impregnated portions formed as described above are immersed in the foregoing liquid of the thermosetting resin. Finally, these thermosetting resins are cured to seal the end portions of the hollow-fiber-shaped porous separation membranes.

The invention as defined by claim 6 is the invention corresponding to the foregoing production method. More specifically, the invention is a method of producing a separation membrane element having a plurality of hollow-fiber-shaped porous separation membranes and a membrane-sealing portion that bundles end portions of the hollow-fiber-shaped porous separation membranes together to seal the end portions. The method has a feature of having the following steps:

(a) a step of forming resin-impregnated portions by impregnating the end portions of the multiple hollow-fiber-shaped porous separation membranes with a solution of a thermosetting resin "b" and subsequently by drying the solution, (b) a step of casting a thermosetting resin "a," which is uncured, into a mold and immersing the resin-impregnated portions in the thermosetting resin "a," which has been cast, and (c) a step of curing the thermosetting resin "a" and the thermosetting resin "b" to seal the end portions of the hollow-fiber-shaped porous separation membranes.

In the above description, the thermosetting resin "a" is a resinous liquid, which is uncured, of a thermosetting resin for forming the membrane-sealing portion (i.e., after the curing, the resin becomes the above-described casting resin), and the thermosetting resin "b" is a resinous liquid, which is uncured, of a pore-filling resin for filling the pores existing at the contact portion at which the hollow-fiber-shaped porous separation membranes are in contact with the membrane-sealing portion. The thermosetting resin "a" and the thermosetting resin "b" may either be the same type or be different types. Nevertheless, as described above, it is desirable that they be the same type of resins. The solution of the thermosetting resin "b" is a liquid formed by dissolving the thermosetting resin "b" in a solvent. The solvent is not limited providing that it dissolves the thermosetting resin "b." However, in view of the productivity, it is desirable to use a solvent easy to be dried.

In this production method, first, end portions of the multiple hollow-fiber-shaped porous separation membranes are impregnated with a solution of the thermosetting resin "b." Then, the impregnating resinous solution is dried to form resin-impregnated portions. At the time of the drying, although the heating for evaporating the solvent forming the resinous solution may be performed, the heating for curing the thermosetting resin "b" is not performed in this stage. To prevent the thermosetting resin "a" from entering the hollow portions, before the immersion in the thermosetting resin "a," it is desired to close the openings of the hollow portions by sealing, tying together, or another method. However, it is desirable that the foregoing sealing, tying together, or the like be performed before the impregnation with the thermosetting resin "b" to prevent the resinous liquid of the thermosetting resin "b" from entering the hollow portions.

Subsequently, the hollow-fiber-shaped porous separation membranes' end portions having the resin-impregnated portions formed as described above are set in a mold (a metal mold or the like). By casting the thermosetting resin "a," which is uncured, into the mold, the resin-impregnated portions are immersed in the thermosetting resin "a." In the method of the present invention for producing the separation membrane element, the length of the resin-impregnated portions can be adjusted, for example, in the step of forming the resin-impregnated portions so that the position of the upper end of the resin-impregnated portions (the boundary between the resin-impregnated portions and resin-unimpregnated portions of the hollow-fiber-shaped porous separation membranes) can be at the same height as or a slightly higher height than that of the surface of the cast resinous liquid in the step of immersion (casting).

In the stage of the step of casting, the pores of the hollow-fiber-shaped porous separation membranes are already filled with the thermosetting resin "b." Consequently, the thermosetting resin "a" is prevented from penetrating into the hollow-fiber-shaped porous separation membranes. Accordingly, this condition can prevent the formation of the portion into which the thermosetting resin "a" penetrates as shown by the basal portion 32a in FIG. 3. This situation can prevent a problem of breakage of the basal portions and leakage of gas or liquid resulting from the loss of the flexibility of the basal portions caused by the curing of the thermosetting resin "a" absorbed in this portion. The position of the upper end of the resin-impregnated portions from the surface of the liquid of the thermosetting resin "a" is set at a height of 5 mm at most, desirably up to 3 mm, more desirably up to 1 mm. On the other hand, when the position is lower than the liquid surface, the thermosetting resin "a" is likely to penetrate into the pores of the hollow-fiber-shaped porous separation membranes. Therefore, this condition is undesirable.

After the step of casting, the thermosetting resin "a" and the thermosetting resin "b" are cured to seal the end portions of the hollow-fiber-shaped porous separation membranes. This process unites the membranes with the membrane-sealing portion to form the separation membrane element. The curing of the thermosetting resin "a" and the thermosetting resin "b" can be carried out by heating them. The production method of the present invention has a feature in that after the above-described step of immersion, the thermosetting resin "a" and the thermosetting resin "b" are cured simultaneously. The simultaneous curing forms a strong bonding between the hollow-fiber-shaped porous separation membranes and the membrane-sealing portion. This strong bonding suppresses troubles such as the pulling-out of a hollow-fiber-shaped porous separation membrane when in use.

Furthermore, the present inventor has intensely studied to solve Problem 2 described above and has found that a cured body of a thermosetting fluororesin not only has excellent formability and excellent chemical resistance but also can form a strong coating on a cured body of urethane resin, epoxy resin, or the like. The inventor has also found that the use of a thermosetting fluororesin enables the formation of a membrane-sealing portion through the immersion forming process as in the case of urethane resin and epoxy resin and the membrane-sealing portion has excellent chemical resistance and that, alternatively, after the formation of a membrane-sealing portion through the immersion forming process using urethane resin, epoxy resin, or the like, in the membrane-sealing portion, at least the portion that is to be in contact with a liquid to be treated can be provided with a coating of a cured body of the thermosetting fluororesin to obtain a membrane-sealing portion having excellent chemical resistance. Thus, an invention having a constitution described below has been completed (the invention is sometimes referred to as Invention 2).

The invention as defined by claim 7 is a separation membrane element having a plurality of hollow-fiber-shaped porous separation membranes and a membrane-sealing portion that bundles end portions of the hollow-fiber-shaped porous separation membranes together to seal the end portions, the element having a feature in that in the membrane-sealing portion, at least the surface at a side that is to be in contact with a liquid to be treated is formed of a thermosetting fluororesin. The invention corresponds to Invention 2.

The basis that the separation membrane element as defined by claim 7 has a plurality of hollow-fiber-shaped porous separation membranes and a membrane-sealing portion that bundles end portions of the hollow-fiber-shaped porous separation membranes together to seal the end portions is also the same as that of the conventional separation membrane element used for gas-liquid absorption, degasification, filtration, and so on in the field of semiconductor production, food-products industry, and the like. In the above description, the meaning of the hollow-fiber-shaped porous separation membranes and the membrane-sealing portion is the same as that explained in Invention 1. In addition, the shape and material of the hollow-fiber-shaped porous separation membranes, the number of membranes, the shape of the membrane-sealing portion, and the like can be the same as those of the conventional separation membrane element.

The separation membrane element as defined by claim 7 has a feature in that in the membrane-sealing portion, at least the surface at a side that is to be in contact with a liquid to be treated is formed of a thermosetting fluororesin. In the above description, the term "the surface at a side that is to be in contact with a liquid to be treated" means the surface exposed to the inner side of the separation membrane module having the separation membrane element as a constituting element (the surface at the side from which the hollow-fiber-shaped porous separation membranes extend). More specifically, the membrane-sealing portion may have a main body formed of a portion composed of a material other than thermosetting fluororesin, such as urethane resin, epoxy resin, or another thermosetting resin. In this case, however, at least the surface exposed to the inner side of the separation membrane module is covered with a cured body of a thermosetting fluororesin. Alternatively, the entire membrane-sealing portion may be composed of a thermosetting fluororesin.

Because the surface exposed to the inner side of the separation membrane module, i.e., the portion to be in contact with the flow of a liquid to be treated when the separation membrane module is used, is formed of a cured body of a thermosetting fluororesin, which has good chemical resistance, the separation membrane element and the separation membrane module having the separation membrane element as a constituting element can have improved durability (chemical resistance).

As described above, the membrane-sealing portion of the separation membrane element of the present invention may be constituted by using urethane resin, epoxy resin, or another thermosetting resin for the main body providing that the surface at a side that is to be in contact with a liquid to be treated is formed of a thermosetting fluororesin. The portion composed of urethane resin, epoxy resin, or another thermosetting resin can be formed through the above-described immersion forming process as with the membrane-sealing portion of the conventional separation membrane element. Consequently, not only is the productivity high but also an anchoring effect can be exercised because the thermosetting resin penetrates into the end portions of the hollow-fiber-shaped porous separation membranes. This system can provide strong bonding force between the hollow-fiber-shaped porous separation membranes and the membrane-sealing portion.

In addition, thermosetting fluororesin is in a liquid state before it is cured and can be cured at a temperature (usually, about 150° C. or less) considerably lower than that at which the hollow-fiber-shaped porous separation membranes will melt or thermally deteriorate. Consequently, by using a thermosetting fluororesin, the membrane-sealing portion can also be formed through the foregoing immersion forming process as with the case of urethane resin, epoxy resin, or another thermosetting resin. Therefore, even when only a thermosetting fluororesin is used, a membrane-sealing portion having excellent bonding force between the hollow-fiber-shaped porous separation membranes and the membrane-sealing portion can be obtained with high productivity.

The invention as defined by claim 8 is the separation membrane element as defined by claim 7, the element having a feature in that in the above-described membrane-sealing portion, the surface at a side at which openings of the hollow-fiber-shaped porous separation membranes are located is further formed of a thermosetting fluororesin.

When the separation membrane module is used, in the membrane-sealing portion, the exposed surface at the side (the outer side) opposite to the surface exposed to the inner side of the separation membrane module, i.e., the surface at a side at which openings of the hollow-fiber-shaped porous separation membranes are located, is also brought into contact with the treated liquid emerging from the openings and possibly deteriorates due to the contact with the treated liquid. This deterioration can be prevented by further forming the surface at a side at which openings of the hollow-fiber-shaped porous separation membranes are located by using a thermosetting fluororesin. This prevention can further improve the durability (the chemical resistance) of the separation membrane element and the separation membrane module having the separation membrane element as a constituting element.

The separation membrane element as defined by claim 7 whose membrane-sealing portion has a portion composed of a material other than thermosetting fluororesin can be produced by the method described below. First, end portions of the hollow-fiber-shaped porous separation membranes are bundled together and set in a thermosetting resin in a liquid state (hereinafter sometimes referred to as a resinous liquid), which is a material other than thermosetting fluororesin. Then, the resinous liquid is cured to seal the end portions of the hollow-fiber-shaped porous separation membranes. Subsequently, in the cured thermosetting resin, at least the surface at a side that is to be in contact with a liquid to be treated is provided with a cured layer of a thermosetting fluororesin.

The setting of the end portions of the hollow-fiber-shaped porous separation membranes into the resinous liquid can be performed by a method in which, first, the resinous liquid is cast into a metal mold or the like and, then, the end portions of the hollow-fiber-shaped porous separation membranes are immersed in the cast resinous liquid. However, the setting is usually conducted by another method in which, first, the end portions of the hollow-fiber-shaped porous separation membranes are bundled together, then, the bundled end portions are set in a metal mold or the like, and, finally, the resinous liquid is cast into the metal mold or the like. The formation of the cured layer of the thermosetting fluororesin can be performed by a method in which, first, the resinous liquid is cured to seal the end portions of the hollow-fiber-shaped porous separation membranes, then, a thermosetting fluororesin, which is uncured, is applied, and, finally, the fluororesin is cured.

The present invention further offers a method of producing the separation membrane element. More specifically, the invention as defined by claim 9 is a method of producing a separation membrane element having a plurality of hollow-fiber-shaped porous separation membranes and a membrane-sealing portion that bundles end portions of the hollow-fiber-shaped porous separation membranes together to seal the end portions. The method has a feature of having the following steps:

(a) a step of bundling end portions of the multiple hollow-fiber-shaped porous separation membranes together to set the end portions in a mold, (b) a step of casting a thermosetting resin, which is uncured, into the mold, (c) after the casting, a step of curing the thermosetting resin to seal the end portions of the hollow-fiber-shaped porous separation membranes, (d) in the thermosetting resin, which has been cured, a step of applying a thermosetting fluororesin, which is uncured, onto at least the surface at a side from which the hollow-fiber-shaped porous separation membranes extend, (e) after the applying, a step of curing the thermosetting fluororesin, and (f) a step of removing the thermosetting resin, which has been cured, from the mold and performing a cutting-away operation at the end-portion side of the hollow-fiber-shaped porous separation membranes to form openings of the hollow-fiber-shaped porous separation membranes.

The types of methods of bundling end portions of the hollow-fiber-shaped porous separation membranes together include a method of sealing the end portions by thermal welding or the like and a method of tying-together by using a string or the like. The sealing or tying-together closes the openings at the end of the hollow-fiber-shaped porous separation membranes and, at the time of the casting (immersing), can prevent the resin from flowing into the hollow portions of the hollow fibers. The step to be performed after the curing of the resin, i.e., the step of removing the thermosetting resin from the mold and performing a cutting-away operation at the end-portion side of the hollow-fiber-shaped porous separation membranes to form openings of the hollow-fiber-shaped porous separation membranes, can expose the openings of the hollow fibers at the end.

After the end portions of the hollow-fiber-shaped porous separation membranes are bundled together as described above, the end portions are set in a mold (a metal mold or the like). By casting the thermosetting resin, which is uncured, (the resinous liquid) into the mold, the portions to be impregnated with resin are immersed in the thermosetting resin. Alternatively, as described above, after the resinous liquid is cast into the mold, the end portions of the hollow-fiber-shaped porous separation membranes may be placed in the mold to immerse them in the resinous liquid.

After the immersion of the end portions of the hollow-fiber-shaped porous separation membranes in the cast resinous liquid, the resinous liquid is cured to seal the end portions of the hollow-fiber-shaped porous separation membranes. Both the step of immersing the end portions of the hollow-fiber-shaped porous separation membranes in the cast resinous liquid and the step of curing the thermosetting resin to seal the end portions of the hollow-fiber-shaped porous separation membranes can be performed with the same procedure and condition as those for the immersion forming process in the production of the conventional separation membrane module. In addition, the materials to be used and the like are also the same. As the thermosetting resin to be used in the above process, a thermosetting resin other than fluororesin, such as epoxy resin and urethane resin, can be used.

The invention as defined by claim 10 is the method of producing a separation membrane element as defined by claim 9, the method having a feature in that after the openings of the hollow-fiber-shaped porous separation membranes are formed, a thermosetting fluororesin is further applied onto the cured thermosetting resin's surface at a side where the openings of the hollow-fiber-shaped porous separation membranes are located and the applied thermosetting fluororesin is cured. The invention is a method of producing a separation membrane element that has a feature in that a thermosetting fluororesin is further applied onto the cured thermosetting resin's surface at a side where the openings of the hollow-fiber-shaped porous separation membranes are located. The separation membrane element as defined by claim 8 can be produced by this production method. In other words, this method can produce a separation membrane element provided with a membrane-sealing portion having a three-layer structure in which both surfaces of the membrane-sealing portion are covered with a cured body of a thermosetting fluororesin, which has high chemical resistance.

The invention as defined by claim 11 is a method of producing a separation membrane element having a plurality of hollow-fiber-shaped porous separation membranes and a membrane-sealing portion that bundles end portions of the hollow-fiber-shaped porous separation membranes together to seal the end portions. The method has a feature of having the following steps:

(a) a step of bundling end portions of the multiple hollow-fiber-shaped porous separation membranes together to set the end portions in a mold, (b) a step of casting a thermosetting fluororesin, which is uncured, into the mold, (c) after the casting, a step of curing the thermosetting fluororesin to seal the end portions of the hollow-fiber-shaped porous separation membranes, and (d) a step of removing the thermosetting fluororesin, which has been cured, from the mold and performing a cutting-away operation at the end-portion side of the hollow-fiber-shaped porous separation membranes to form openings of the hollow-fiber-shaped porous separation membranes.

This production method is a method of producing a separation membrane element whose membrane-sealing portion is formed only of a thermosetting fluororesin. This method carries out the immersion forming process, which is conventionally performed by using urethane resin, epoxy resin, or another thermosetting resin, by using a thermosetting fluororesin. Consequently, as described earlier, a membrane-sealing portion having excellent bonding force between the hollow-fiber-shaped porous separation membranes and the membrane-sealing portion can be obtained with high productivity. In this case, because the membrane-sealing portion is formed only of the thermosetting fluororesin, both the surface at a side that is to be in contact with a liquid to be treated and the surface at a side at which openings of the hollow-fiber-shaped porous separation membranes are located are formed of the thermosetting fluororesin. Therefore, it is not necessary to perform a step of applying an uncured thermosetting fluororesin onto a surface of the cured thermosetting resin and, subsequently, curing the thermosetting fluororesin, the step being included in the production methods as defined by claims 9 and 10. Accordingly, a membrane-sealing portion having excellent chemical resistance can be obtained through only the same process as that of the conventional immersion forming process.

The production methods as defined by claims 9 to 11 employ a thermosetting fluororesin that is in a liquid state at a temperature considerably lower than that at which the hollow-fiber-shaped porous separation membranes will melt or thermally deteriorate, desirably at about 150° C. or less, that can be cured at such a low temperature, and that can produce a cured body having excellent chemical resistance. In addition, it is desirable that the thermosetting fluororesin have excellent mechanical strength and be able to easily form a strong coating when applied onto a cured body of urethane resin or epoxy resin. The present inventor has intensely studied and has found a suitable thermosetting fluororesin having the above-described properties. Claims 12 to 15 described below are each for a method of producing a separation membrane element, the method having a feature of using the above-described thermosetting fluororesin.

The invention as defined by claim 12 is the method of producing a separation membrane element as defined by any of claims 9 to 11, the method having a feature in that the thermosetting fluororesin is a composite containing:
(a) a perfluoropolyoxyalkane dicarboxylic acid expressed as the formula HOOCCF$_2$-[(OCF$_2$CF$_2$)p-(OCF$_2$)q]-OCF$_2$COOH (in the formula, p=2 to 20, and q=2 to 20) or its derivative, and
(b) a multifunctional compound that condensation-polymerizes with the perfluoropolyoxyalkane dicarboxylic acid or its derivative.

In the above formula, it is desirable that "p" and "q" be each in the range of 2 to 10, more desirably in the range of 4 to 8 in particular. It is particularly desirable to employ "p" and "q" that give an average molecular weight of 1,500 or so.

As the foregoing multifunctional compound that condensation-polymerizes with the perfluoropolyoxyalkane dicarboxylic acid or its derivative, an epoxy compound is shown as an example. The types of the epoxy compound include diglycidyl ether, triglycidyl ether, and tetraglycidyl ether of, for example, a multifunctional phenol compound, such as bisphenol A, bisphenol F, or novolak resin. More specifically, bisphenol-type epoxy, such as Epoxy 1 described below, can be shown as an example. Nevertheless, an epoxy containing a flexible constituent, such as Epoxy 2 or Epoxy 3 described below, is more desirable.

Epoxy 1: bisphenol-type epoxy
Epoxy 2: an epoxy resin expressed by the following structural formula:

[Chemistry 1]

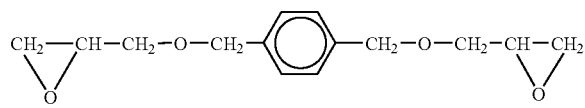

Epoxy 3: polypropylene glycol diglycidyl ether

It is desirable to add about 0.1% to 2% tertiary amine, such as (dimethylaminomethyl)phenol or N-aminoethylpiperazine, to the composite of the thermosetting fluororesin in order to promote the reaction.

The invention as defined by claim 13 is the method of producing a separation membrane element as defined by any of claims 9 to 11, the method having a feature in that the thermosetting fluororesin containing:
(a) a perfluoropolyoxyalkane dihydroxy expressed as the formula HOCF$_2$-[(OCF$_2$CF$_2$)p-(OCF$_2$)q]-OCF$_2$OH (in the formula, p=2 to 20, and q=2 to 20) or its derivative, and
(b) a multifunctional compound that condensation-polymerizes with the perfluoropolyoxyalkane dihydroxy or its derivative.

In the above formula, it is desirable that "p" and "q" be each in the range of 2 to 10, more desirably in the range of 4 to 8 in particular. It is particularly desirable to employ "p" and "q" that give an average molecular weight of 1,500 or so.

The types of the multifunctional compound that condensation-polymerizes with the perfluoropolyoxyalkane dihydroxy or its derivative include isocyanate compounds, such as methylenebis(4,1-phenylene)diisocyanate (MDI).

The invention as defined by claim 14 is the method of producing a separation membrane element as defined by any of claims 9 to 11, the method having a feature in that the thermosetting fluororesin contains a perfluoropolyoxyalkane having a silane functional group at the ends of the formula expressed as XCF$_2$-[(OCF$_2$CF$_2$)p-(OCF$_2$)q]-OCF$_2$X (in the formula, X denotes a silane functional group, p=2 to 20, and q=2 to 20).

In the above formula, it is desirable that "p" and "q" be each in the range of 2 to 10, more desirably in the range of 4 to 8 in particular. It is particularly desirable to employ "p" and "q" that give an average molecular weight of 1,500 or so. As the silane functional group X, —SiH, —SiCl, and —SiOR (R denotes an alkyl group such as CH$_3$ or C$_2$H$_5$) are shown as examples.

The invention as defined by claim 15 is the method of producing a separation membrane element as defined by any of claims 9 to 11, the method having a feature in that the thermosetting fluororesin contains a silicone compound that has perfluoroalkyl ethers and that is expressed by formula (I) below:

[Chemistry 2]

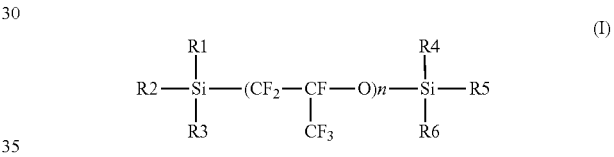

(In the formula, n=2 to 50; R1, R2, R3, R4, R5, and R6 are each an alkyl group or an alkenyl group; and at least one group among R1, R2, and R3 and at least one group among R4, R5, and R6 are each an alkenyl group.)

As the alkyl group denoted by R1, R2, R3, R4, R5, or R6, alkyls having 1 to 4 carbons, such as CH$_3$ and C$_2$H$_5$, are shown as examples. As the alkenyl group denoted by R1, R2, R3, R4, R5, or R6, alkenyls having 3 to 6 carbons, such as C$_3$H$_5$ and C$_4$H$_7$, are shown as examples.

In both of Inventions 1 and 2, in the separation membrane element of the present invention, the material forming the hollow-fiber-shaped porous separation membranes, the configuration of the membranes, and the like are the same as those of the conventional separation membrane element. For example, as the material for the hollow-fiber-shaped porous separation membranes, fluororesin, polyethylene, polyether sulfone, and so on are likely to be used. Of these, the material formed of fluororesin is desirably used in terms of chemical resistance, flexibility, mechanical strength, and so on. Claim 16 corresponds to this desirable embodiment.

As the fluororesin, the following various types of fluororesins can be used singly or in combination of a plurality of types: polytetrafluoroethylene (PTFE), a tetrafluoroethylene/perfluoro(alkyl vinyl ether) copolymer (PFA), a tetrafluoroethylene/hexafluoropropylene copolymer (FEP), an ethylene/tetrafluoroethylene copolymer (ETFE), polychlorotrifluoroethylene (PCTFE), an ethylene/chlorotrifluoroethylene copolymer (ECTFE), polyvinylidene fluoride (PVDF), and the like. It is particularly desirable to use PTFE because it not only has excellent forming processibility but also has excellent mechanical strength.

The present invention offers not only the above-described separation membrane element but also a separation membrane module having a feature of incorporating the separation membrane element. More specifically, the separation membrane module has a feature in that it has the separation membrane element as defined by any one of claims 1 to 5, 7, 8, and 16 and a housing that houses the separation membrane element, the separation membrane element being united with the housing (claim 17).

As for the separation membrane module of the present invention, the basis that the separation membrane module has a separation membrane element and a housing that houses the element, the method of uniting the separation membrane element and the housing, the type and configuration of the housing, and the like can be the same as those of the conventional separation membrane module used for gas-liquid absorption, degasification, filtration, and so on in the field of semiconductor production, food-products industry, and the like. For example, the uniting of the separation membrane element and the housing can be performed through bonding between the membrane-sealing portion and the housing, gasket sealing, or the like.

Effect of the Invention

The separation membrane element of Invention 1 and the separation membrane module incorporating the separation membrane element can be produced through a method having excellent productivity in which, first, end portions of the hollow-fiber-shaped porous separation membranes are immersed in a resinous liquid and, then, the resin is cured to form a membrane-sealing portion. In spite of the highly productive method, the basal portions of the hollow-fiber-shaped porous separation membranes are flexible, so that the breakage of the basal portions and the leakage of the gas or liquid are less likely to occur when the separation membrane element and the separation membrane module are in use. Furthermore, the bonding ability between the hollow-fiber-shaped porous separation membranes and the membrane-sealing portion is excellent.

The separation membrane element of Invention 2 and the separation membrane module incorporating the separation membrane element have a membrane-sealing portion produced through a method having excellent productivity in which, first, end portions of the hollow-fiber-shaped porous separation membranes are immersed in a resinous liquid and, then, the resin is cured. Although produced through the highly productive method, the membrane-sealing portion has excellent chemical resistance comparable to that of the conventional membrane-sealing portion formed of a thermoplastic fluororesin.

The separation membrane element having the above-described excellent features can be easily produced through the method of the present invention for producing a separation membrane element.

EXPLANATION OF SIGNS

Figure 1:
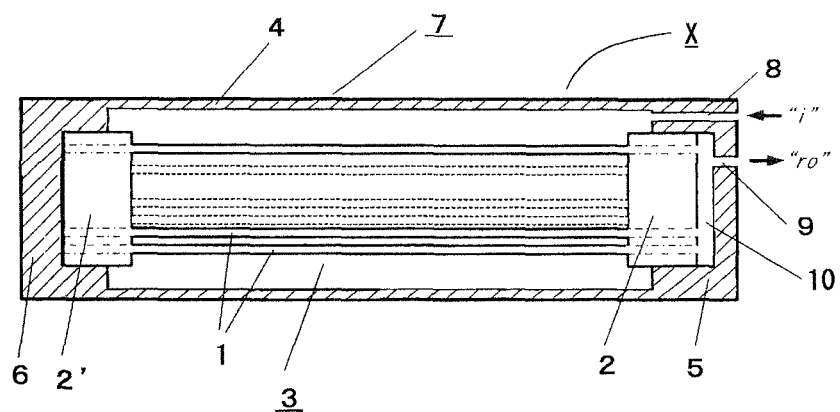
FIG. 1 is a schematic sectional view of an example of the separation membrane module of the present invention.

X and Y: Separation membrane module
1, 21, and 35: Hollow-fiber-shaped porous separation membrane
1' and 35': Hollow portion
1a and 32a: Basal portion of a hollow-fiber-shaped porous separation membrane
2, 2', 22, and 22': Membrane-sealing portion
2a and 2b: Thermosetting fluororesin layer
2c: Main-body portion
3 and 23: Separation membrane element
4 and 24: Cylindrical member
5, 6, 25, and 26: Cap
7 and 27: Housing
8, 28, and 31: Inlet
9, 29, and 30: Outlet
10: Liquid reservoir
11 and 34: Opening-closed portion
12: Thermosetting resin "b"
13: Resin-impregnated portion
13': Penetration portion
14: Sealing resin
32: End portion
33: Resinous liquid

BEST MODE FOR CARRYING OUT THE INVENTION

An explanation is given below to the best mode for carrying out the present invention by referring to embodiments, examples, and others. The scope of the present invention is not limited to the mode or embodiments and can be modified variously within the scope that does not deviate from the gist of the present invention.

FIG. 1 is a sectional view schematically showing a section of a separation membrane module X to be used for filtering a liquid to be treated.

The separation membrane module X is provided with a separation membrane element 3 that has a plurality of PTFE hollow-fiber-shaped porous separation membranes 1 placed nearly in parallel with a space between adjacent membranes, bundled together at both ends in the axial direction, and united with epoxy-resin membrane-sealing portions 2 and 2' and with a pressure-resistant housing 7 that has a cylindrical member 4 having the shape of a circular hollow cylinder and that has caps 5 and 6 for closing the opening at both ends of the cylindrical member. Ends of the hollow-fiber-shaped porous separation membranes 1 are opened at the outside end faces of the membrane-sealing portions 2 and 2'. The openings at the outside end face of the membrane-sealing portion 2' are closed with the cap 6.

The other cap 5 is provided with an inlet 8 for introducing the liquid to be treated and an outlet 9 for delivering the transmitted liquid. In addition, a liquid reservoir 10 is provided between the cap 5 and the membrane-sealing portion 2 of the separation membrane element 3. When the separation membrane element 3 corresponds to Invention 1, the types of material for forming the membrane-sealing portions include not only epoxy resin but also urethane resin and other thermosetting resins. Nevertheless, it is desirable to use epoxy resin in terms of mechanical strength, chemical resistance, and cost.

In the separation membrane module X having the above-described structure, the liquid to be treated is introduced into the inside of the separation membrane module X from the inlet 8 of the cap 5, as shown by the arrow "i." The liquid is transmitted through the hollow-fiber-shaped porous separation membranes 1, and the filtration is performed with their through holes. The transmitted liquid travels along the inside of the tube of the individual hollow-fiber-shaped porous separation membranes 1, arrives at the liquid reservoir 10, and is delivered to the outside of the separation membrane module X from the outlet 9, as shown by the arrow "ro."

Figure 2:
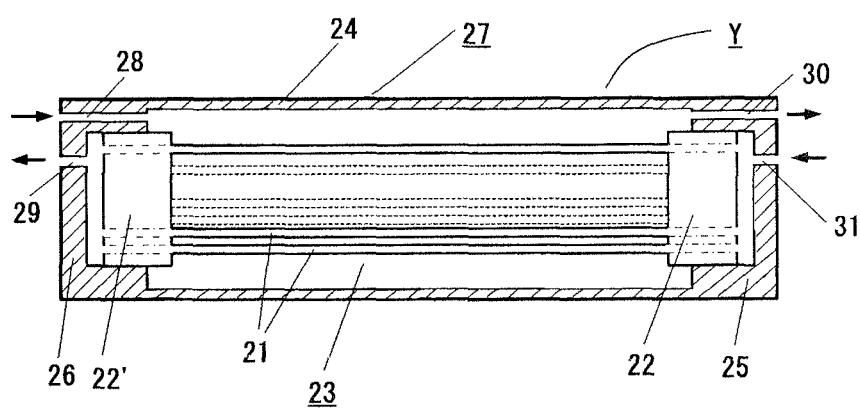
FIG. 2 is a schematic sectional view of another example of the separation membrane module of the present invention.
Figure 3:
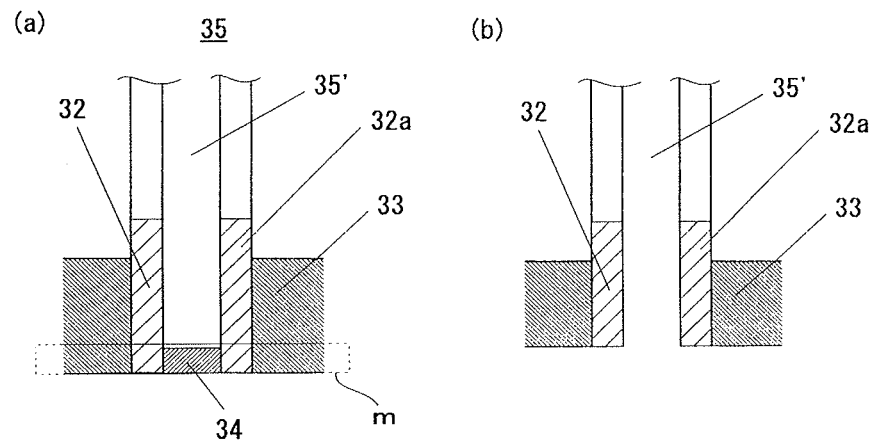
FIG. 3 is a schematic diagram showing a method of producing a conventional separation membrane element.

FIG. 2 shows a sectional view of a separation membrane module Y, which is another embodiment of the separation membrane module of the present invention. The separation membrane module Y is a separation membrane module to be used for gas-liquid absorption for ozone dissolution and the like.

As with the separation membrane module X, the separation membrane module Y is provided with a separation membrane element 23 that has a plurality of PTFE hollow-fiber-shaped porous separation membranes 21 placed nearly in parallel with a space between adjacent membranes, bundled together at both ends in the axial direction, and united with membrane-sealing portions 22 and 22' and with a pressure-resistant housing 27 that has a cylindrical member 24 having the shape of a circular hollow cylinder and that has caps 25 and 26 for closing the opening at both ends of the cylindrical member. Ends of the hollow-fiber-shaped porous separation membranes 21 have openings at the outside end faces of the membrane-sealing portions 22 and 22' so that the liquid to be treated can travel from the openings at one end of the hollow-fiber-shaped porous separation membranes 21 to the openings at the other end. Of the two caps, the cap 26 is provided with an inlet 28 for introducing the gas and an outlet 29 for delivering the treated liquid, and the cap 25 is provided with an outlet 30 for discharging the gas and an inlet 31 for introducing the liquid to be treated.

The liquid to be treated is introduced from the inlet 31 into the inside of the tubes of the hollow-fiber-shaped porous separation membranes 21, flows while maintaining contact with the inner side of the hollow-fiber-shaped porous separation membranes 21, and is delivered to the outside of the separation membrane module Y from the outlet 29. The gas is introduced from the inlet 28 into the housing 27 of the separation membrane module Y, flows while maintaining contact with the outer side of the hollow-fiber-shaped porous separation membranes 21, and is discharged to the outside of the separation membrane module Y from the outlet 30. During this process, gas-liquid absorption is performed through the through holes of the hollow-fiber-shaped porous separation membranes 21.

The position for placing the inlets and outlets of the separation membrane modules X and Y and other design details are to be modified as appropriate depending on the gas and liquid to be treated, the nature of the treatment, and so on.

Figure 4:
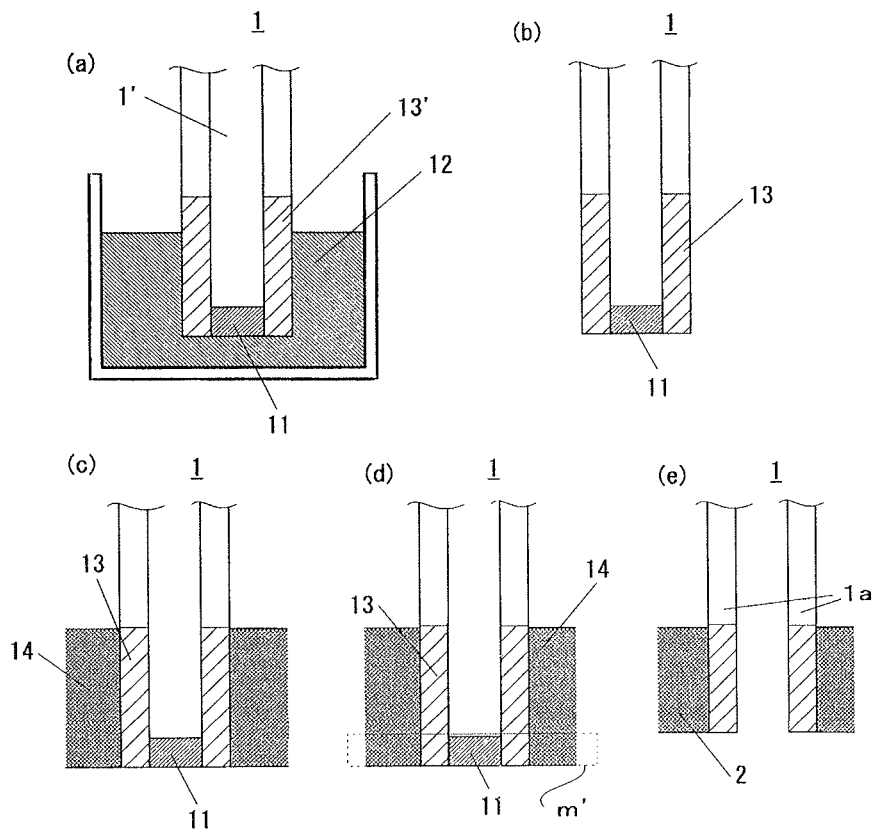
FIG. 4 is a schematic diagram showing the process of producing a separation membrane element.

Next, the method of producing the separation membrane element 3 corresponding to Invention 1 is explained based on FIG. 4. FIG. 4 is a sectional view illustrating individual steps of the production method by enlarging the end portion of one of the multiple hollow-fiber-shaped porous separation membranes 1 forming the separation membrane element 3.

First, as shown in FIG. 4(*a*), an end portion of the hollow-fiber-shaped porous separation membrane 1 is immersed in a thermosetting resin "b" 12, which is produced by dissolving an epoxy resin in a solvent. At this moment, an opening-closed portion 11 is formed by sealing the opening of the hollow portion 1' in advance to prevent the thermosetting resin "b" 12 (and below-described thermosetting resin "a") from entering the hollow portion 1' of the hollow-fiber-shaped porous separation membrane 1.

The immersion causes the thermosetting resin "b" 12 to penetrate into numerous pores (the pores are not shown) formed in the hollow-fiber-shaped porous separation membrane 1. The portion into which the resin penetrates is referred to as a penetration portion 13'. As shown in FIG. 4(*a*), the penetration portion 13' usually becomes larger than the portion that is actually immersed due to the capillary phenomenon. As the thermosetting resin "b," not only epoxy resin but also urethane resin or another thermosetting resin is used. Nevertheless, as described before, it is desirable to use a resin having flexibility even after it is cured. The types of the solvent for forming the thermosetting resin "b" include methyl ethyl ketone and isopropyl alcohol.

Subsequently, the hollow-fiber-shaped porous separation membrane 1 is pulled up to dry the resinous liquid 12 in the penetration portion 13'. Thus, a resin-impregnated portion 13 is formed at the end portion of the hollow-fiber-shaped porous separation membrane 1 (FIG. 4(*b*)). Next, a plurality of hollow-fiber-shaped porous separation membranes 1 are bundled together. Under the condition that the multiple hollow-fiber-shaped porous separation membranes 1 are bundled together, the resin-impregnated portions 13 are positioned to face downward and set in a mold (not shown) placed below.

Subsequently, a thermosetting resin "a" (hereinafter referred to as the sealing resinous liquid 14) is cast into the mold to immerse the end portions of the hollow-fiber-shaped porous separation membranes 1 in the sealing resinous liquid 14 so that the circumferential portion of the bundle of the hollow-fiber-shaped porous separation membranes 1 and the interstices of the hollow-fiber-shaped porous separation membranes 1 can be filled with the sealing resinous liquid 14 (FIG. 4(*c*)). Because the sealing resinous liquid 14 is a resinous liquid for forming the membrane-sealing portion, as described above, an epoxy-resin liquid, an urethane-resin liquid, or the like, each of which is uncured, is used for it.

As shown in FIG. 4(*c*), when the sealing resinous liquid 14 is cast into the mold, the position of the upper end of the resin-impregnated portion 13 is set to be at the same height as or a slightly higher height than that of the surface of the sealing resinous liquid 14 after the casting is completed. Under this condition, the resin-impregnated portion 13 is immersed in the sealing resinous liquid 14. Because the pores of the hollow-fiber-shaped porous separation membrane 1 are already filled with the thermosetting resin "b" 12, the sealing resinous liquid 14 does not penetrate into the pores in the basal portion of the hollow-fiber-shaped porous separation membrane 1 by the capillary phenomenon. This condition can suppress the problem of easy occurrence of breakage of the basal portion and leakage of gas or liquid resulting from the penetration of the thermosetting resin "a" into the basal portion and the curing of it.

After the above-described immersion, a heating operation cures the thermosetting resin "b" in the resin-impregnated portion 13 and the thermosetting resin "a" (the sealing resinous liquid 14) that is cast in the mold. This curing bonds the two resins at their interface, thereby uniting the hollow-fiber-shaped porous separation membrane 1 and the membrane-sealing portion 2. Next, the mold is detached. The end portion of the hollow-fiber-shaped porous separation membrane 1 including the opening-closed portion 11 and the membrane-sealing portion 2 in the vicinity of the end portion (the m' portion in FIG. 4(d)) are severed (FIG. 4(d)). As a result, the hollow portion 1' of the hollow-fiber-shaped porous separation membrane 1 is opened at the end face of the membrane-sealing portion 2 (FIG. 4(e)). The above operation produces the separation membrane element 3 in which the membrane-sealing portion 2 is united with the hollow-fiber-shaped porous separation membrane 1 and the flexibility of the basal portions 1a of the hollow-fiber-shaped porous separation membrane 1 is secured. By housing the separation membrane element 3 in the housing 7, the separation membrane module X of Invention 1 can be obtained.

Figure 5:
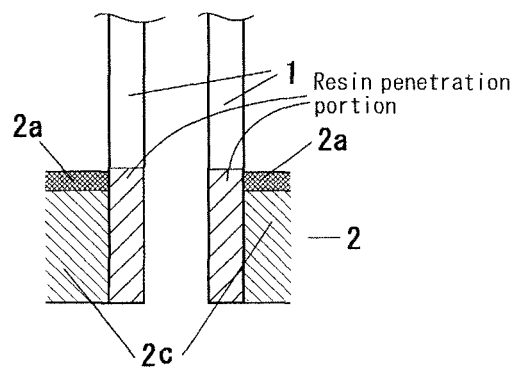
FIG. 5 is a sectional view showing an end portion of a hollow-fiber-shaped porous separation membrane and a membrane-sealing portion in the vicinity of the end portion.
Figure 6:
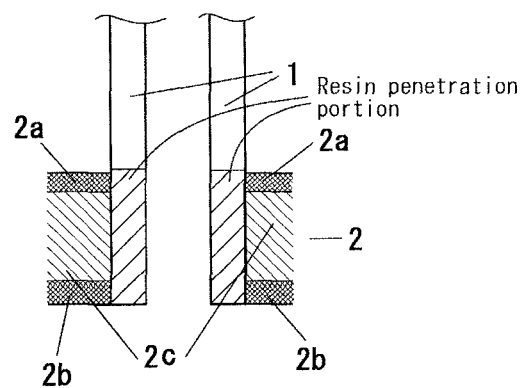
FIG. 6 is a sectional view showing an end portion of a hollow-fiber-shaped porous separation membrane and a membrane-sealing portion in the vicinity of the end portion.
Figure 7:
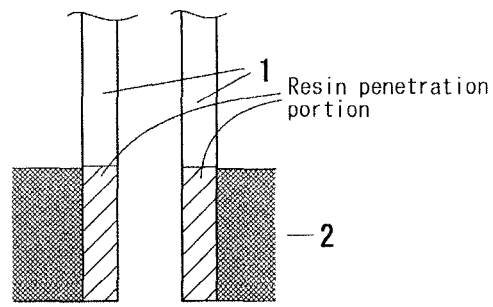
FIG. 7 is a sectional view showing an end portion of a hollow-fiber-shaped porous separation membrane and a membrane-sealing portion in the vicinity of the end portion.

Next, examples of the detailed structure of the membrane-sealing portion 2, which is a portion characteristic of Invention 2, are explained based on FIGS. 5 to 7. FIGS. 5 to 7 are enlarged sectional views each showing the end portion of one of the multiple hollow-fiber-shaped porous separation membranes 1 forming the separation membrane element 3 and the membrane-sealing portion 2 in the vicinity of the end portion. An explanation is given below to the membrane-sealing portion 2. However, because the membrane-sealing portions 2', 22, and 22' can also have the same structure as that of the membrane-sealing portion 2, explanations for them are omitted.

FIG. 5 is a sectional view showing an embodiment of the membrane-sealing portion 2. In this example, the membrane-sealing portion 2 is composed of a main-body portion 2c made of epoxy resin and a thermosetting fluororesin layer 2a. The thermosetting fluororesin layer 2a covers the membrane-sealing portion 2's surface at the side that comes into contact with the liquid to be treated. In this description, "the surface at the side that comes into contact with the liquid to be treated" is the surface at the side indicated by "a" in FIG. 1 (or FIG. 2). As shown in FIG. 5, the hollow-fiber-shaped porous separation membrane 1 is implanted in the membrane-sealing portion 2 and opened at the surface (the surface at the side indicated by "b" in FIG. 1 (or FIG. 2)) which is opposite to the surface at the side that comes into contact with the liquid to be treated.

In this embodiment, the surface at the side that comes into contact with the liquid to be treated is covered with the thermosetting fluororesin layer 2a, which has excellent chemical resistance. Consequently, the chemical resistance of the membrane-sealing portion 2 can be improved. The separation membrane element in this embodiment can be produced through the procedure shown below.

First, the end portions of the multiple hollow-fiber-shaped porous separation membranes 1 are sealed by thermal welding or the like and bundled together. The end portions are positioned to face downward and set in a mold placed below. Subsequently, an epoxy resin in a liquid state is cast into the mold to immerse the end portions of the hollow-fiber-shaped porous separation membranes 1 in the epoxy resin. At this moment, because the openings at the end of the hollow-fiber-shaped porous separation membranes 1 are sealed by the thermal welding or the like, the epoxy resin does not enter the hollow portions of the hollow fibers.

After the immersion, the epoxy resin is cured by heating to form the main-body portion 2c of the membrane-sealing portion 2. This curing unites the hollow-fiber-shaped porous separation membranes 1 with the main-body portion 2c. When the end portions of the hollow-fiber-shaped porous separation membranes 1 are immersed in the epoxy resin, the epoxy resin penetrates into the porous materials of the end portions. As a result, an anchoring effect is exercised by the heating for curing. The same can be said in the following example shown in FIG. 6.

Next, a thermosetting fluororesin liquid is applied onto the main-body portion 2c's surface at the side from which the hollow-fiber-shaped porous separation membranes 1 extend. Then, the heating is performed to cure the thermosetting fluororesin liquid. This curing forms the thermosetting fluororesin layer 2a. After the formation of the thermosetting fluororesin layer 2a, the mold is detached. Then, the hollow-fiber-shaped porous separation membranes 1's end portions including the portions sealed by the thermal welding or the like are cut away together with the membrane-sealing portion in the vicinity of the end portions (i.e., the cutting-away operation is performed at the surface side opposite to the side from which the hollow-fiber-shaped porous separation membranes 1 extend). This cutting-away operation forms the openings of the hollow-fiber-shaped porous separation membranes. On the other hand, in the case of the production of a membrane-sealing portion having no openings of the hollow-fiber-shaped porous separation membranes as in the case of the membrane-sealing portion 2', it is not necessary to perform the step of cutting away the end portions of the hollow-fiber-shaped porous separation membranes 1 and the membrane-sealing portion in the vicinity of the end portions (it is not necessary to perform the step stated in claim 9 in which the cured thermosetting resin is removed from the mold and the end-portion side of the hollow-fiber-shaped porous separation membranes undergoes a cutting-away operation to form openings of the hollow-fiber-shaped porous separation membranes).

FIG. 6 is a sectional view showing another embodiment of the membrane-sealing portion 2. In this example, the membrane-sealing portion 2 is composed of a main-body portion 2c made of epoxy resin and thermosetting fluororesin layers 2a and 2b. The thermosetting fluororesin layer 2a covers the membrane-sealing portion 2's surface at the side that comes into contact with the liquid to be treated, and the thermosetting fluororesin layer 2b covers the surface opposite to the foregoing surface (the surface to be covered by the layer 2b is the surface at the side indicated by the sign "b" in FIG. 1 (or FIG. 2)). As shown in FIG. 6, the hollow-fiber-shaped porous separation membrane 1 is implanted in the membrane-sealing portion 2 and opened at the side of the layer 2b, which is located at the surface opposite to the surface at the side that comes into contact with the liquid to be treated.

In this embodiment, both the surface at the side that comes into contact with the liquid to be treated and the surface at the opposite side are covered with the thermosetting fluororesin layer 2a, which has excellent chemical resistance. Consequently, the chemical resistance of the membrane-sealing portion 2 can be further improved. The separation membrane element in this embodiment can be produced through the procedure shown below.

First, the main-body portion 2c is formed as with the example shown in FIG. 5. At this moment, the hollow-fiber-shaped porous separation membranes 1 are united with the main-body portion 2c. Before the formation of the thermosetting fluororesin layer 2a, the mold is detached. After the mold is detached, the hollow-fiber-shaped porous separation membranes 1's end portions including the portions sealed by the thermal welding or the like are cut away together with the membrane-sealing portion in the vicinity of the end portions. This cutting-away operation forms the openings of the hollow-fiber-shaped porous separation membranes. Next, a thermosetting fluororesin liquid is applied onto both surfaces of the main-body portion 2c. Then, the heating is performed to cure the thermosetting fluororesin liquid. This curing forms the thermosetting fluororesin layers 2a and 2b.

In the embodiment shown in FIG. 7, the membrane-sealing portion 2 is formed only of a thermosetting fluororesin. In the separation membrane element of this embodiment, the membrane-sealing portion 2 is formed through the same procedure as employed in the formation of the main-body portion 2c in the embodiment shown in FIG. 5, except that a thermosetting fluororesin in a liquid state is used in place of the epoxy resin in a liquid state. This operation unites the hollow-fiber-shaped porous separation membranes 1 with the membrane-sealing portion 2. When the end portions of the hollow-fiber-shaped porous separation membranes 1 are immersed in the thermosetting fluororesin in a liquid state, the thermosetting fluororesin penetrates into the end portions. Consequently, the heating for curing the resin enables the exercising of the anchoring effect, which is the same as in the example shown in FIG. 5.

In the membrane-sealing portion 2 formed as described above, both the surface at the side that comes into contact with the liquid to be treated and the surface at the opposite side (the side at which the openings of the hollow-fiber-shaped porous separation membranes 1 are located) are formed of a cured body of the thermosetting fluororesin. Consequently, both surfaces have excellent chemical resistance. Therefore, it is not necessary to perform the step of applying a thermosetting fluororesin onto these surfaces to cure it (this step is performed in the embodiments shown in FIGS. 5 and 6). Accordingly, the production process of this embodiment is simpler than that of the embodiments shown in FIGS. 5 and 6 in this respect. Nevertheless, because the thermosetting fluororesin is costly, the embodiments shown in FIGS. 5 and 6 are advantageous in terms of material cost. After the mold is detached, the hollow-fiber-shaped porous separation membranes 1's end portions including the portions sealed by the thermal welding or the like are cut away together with the membrane-sealing portion in the vicinity of the end portions. This cutting-away operation forms the openings of the hollow-fiber-shaped porous separation membranes. Thus, the separation membrane element is obtained.

The separation membrane element obtained as described above, i.e., the separation membrane element having such an end structure as shown in FIG. 5, 6, or, 7, is housed in a housing through an ordinary method. Thus, the separation membrane module of Invention 2 can be obtained.

EXAMPLES

Examples 1 to 5 and Comparative Example 1

Preparation of Thermosetting Resin "a" (Hereinafter Referred to as Sealing Resin)

Sealing resins A, B, C, and D were each obtained by mixing a main material and a curing agent with a composition shown in Table I. Numerals in Table I (except for the hardness) show the composition ratio (weight parts).

Preparation of Thermosetting Resin "b" (Hereinafter Referred to as Impregnating Resin)

Impregnating resins I, II and III were each obtained by mixing a main material and a curing agent with a composition shown in Table II. Numerals in Table II (except for the hardness) show the composition ratio (weight parts).

Measurement of Hardness of Cured Body of Impregnating Resin and Cured Body of Sealing Resin The impregnating resin and sealing resin (both in a liquid state) prepared as described above were each cast in a mold. The cast resins were heated at 100° C. for four hours to produce blocks for evaluation with a size having an area of 30 mm square and a thickness of 10 mm. The individual blocks for evaluation were subjected to hardness measurement in an environment of 25° C. in conformity with JIS K 7215 "Testing methods for durometer hardness of plastics" using the durometer D type (made by TECLOCK Corporation). The measured results are also shown in Tables I and II.

TABLE I

| | Sealing resin | | | |
|---|---|---|---|---|
| | A | B | C | D |
| Main material | Bis A (100) | Bis A (100) | Bis F (50) PPG (50) | Bis F (50) PPG (50) |
| Curing agent | Aromatic (20) | Aliphatic T (40) | Aliphatic T (40) | Aliphatic D (40) |
| Hardness | 85 degrees | 65 degrees | 40 degrees | 35 degrees |

TABLE II

| | Impregnating resin | | |
|---|---|---|---|
| | I | II | III |
| Main material | Bis F (100) | Bis F (100) PPG (50) | Bis F (50) PPG (50) |
| Curing agent | Aliphatic T (40) | Aliphatic T (40) | Aliphatic D (40) |
| Hardness | 60 degrees | 40 degrees | 35 degrees |

The meaning of the abbreviations used in Tables I and II above is shown below.

Bis A: Bisphenol A-type epoxy resin (EPICLON 850, made by Dainippon Ink and Chemicals, Incorporated)

Bis F: Bisphenol F-type epoxy resin (EPICLON 830, made by Dainippon Ink and Chemicals, Incorporated)

PPG: Polypropylene glycol diglycidyl ether-type epoxy resin (PG-201N, made by Tohto Kasei Co., Ltd.)

Aromatic: Aromatic polyamine (Ancamine Z, made by PTI JAPAN LTD.)

Aliphatic D: Aliphatic polyamine (Jefamin D-400, made by PTI JAPAN LTD.) diamine Aliphatic T: Aliphatic polyamine (Jefamin T-403, made by PTI JAPAN LTD.) triamine Production of Separation Membrane Element 3

The separation membrane element 3 was produced based on the production method shown in FIG. 4. In the following explanation, the individual member bears the same number as used in FIG. 4.

(1) Preparation of Hollow-Fiber-Shaped Porous Separation Membranes 1

Ten PTFE hollow-fiber-shaped porous separation membranes 1 (Poreflon tubes, made by Sumitomo Electric Fine Polymer, Inc.) were prepared each of which had an outer diameter of 2.3 mm, an inner diameter of 1.1 mm, and a pore diameter of 2 μm.

(2) Preparation of Impregnating Resin (Thermosetting Resin "b")

A quantity of 10 g of each of the impregnating resins shown in Table II was dissolved in 100 g of methyl ethyl ketone to produce the impregnating resinous liquid 12.

(3) Formation of Resin-Impregnated Portions 13 of Hollow-Fiber-Shaped Porous Separation Membranes 1

End portions at one end of the hollow-fiber-shaped porous separation membranes 1 were tied together to seal them. The end portions were immersed in the impregnating resinous liquid 12 for 10 minutes to cause the liquid 12 to penetrate sufficiently into the pores of the hollow-fiber-shaped porous separation membranes 1. The hollow-fiber-shaped porous separation membranes 1 were pulled up from the impregnating resinous liquid 12 to dry them at room temperature to volatilize the methyl ethyl ketone. Thus, the resin-impregnated portions 13 were formed. End portions of the other end of the hollow-fiber-shaped porous separation membranes 1 were treated by the same method as above to form the resin-impregnated portions 13.

(4) Casting of Sealing Resin (Thermosetting Resin "a")

The 10 hollow-fiber-shaped porous separation membranes 1 obtained as described above were bundled together with a space between adjacent membranes and set in a mold such that the resin-impregnated portions 13 face downward. The liquid of the sealing resin (the sealing resinous liquid 14) shown in Table I was heated to 40° C. to reduce its viscosity and cast into the mold in which the resin-impregnated portions 13 of the hollow-fiber-shaped porous separation membranes 1 were set. This casting filled the circumferential portion of the bundle of the hollow-fiber-shaped porous separation membranes 1 and the interstices of the hollow-fiber-shaped porous separation membranes 1 with the liquid. At this moment, the resin-impregnated portions 13 were immersed in the sealing resinous liquid 14 in such a way that the upper end of the resin-impregnated portions 13 was positioned at a height of 1 mm or less from the surface of the cast sealing resinous liquid 14.

(5) Sealing of End Portions of Hollow-Fiber-Shaped Porous Separation Membranes 1

Subsequently, the heating was conducted at 100° C. for four hours to simultaneously cure the impregnating resin in the resin-impregnated portion 13 and the sealing resin 14 both in the mold to bond the two resins at their interface.

(6) After the curing, the mold was detached. Then, as shown in FIGS. 4(d) and (e), the membrane-sealing portion 2 in the vicinity of the end portions of the hollow-fiber-shaped porous separation membranes 1 was severed together with the end portions to open the hollow portions of the hollow-fiber-shaped porous separation membranes 1. Thus, the separation membrane element 3 was produced that had a structure in which both ends of the hollow-fiber-shaped porous separation membranes were united with the membrane-sealing portions 2 made of resin.

Evaluation of Chemical Resistance

The separation membrane element 3 produced as described above was immersed for 1,000 hours in each of the chemical agents (i) to (v) shown below. Under this condition, the membrane-sealing portion 2 was aerated through air bubbling, and the hollow-fiber-shaped porous separation membranes 1 were oscillated at least three times per minute in an angular range of 2 to 5 degrees with the basal portions positioned at the center.

(i) A 4% sulfuric acid aqueous solution, (ii) a 4% sodium hydroxide aqueous solution, (iii) a sodium hypochlorite aqueous solution equivalent to 3,000 ppm of effective chlorine, (iv) isopropyl alcohol, and (v) methyl ethyl ketone.

Subsequently, an air-leakage test in water described below was carried out to examine the occurrence of leakage at the basal portions of the hollow-fiber-shaped porous separation membranes 1. Thus, the resistance to the breakage of the basal portions and leakage of air or liquid was evaluated. In addition, a drawing test described below was carried out. Based on the test results, the bonding ability between the membrane-sealing portion 2 and the hollow-fiber-shaped porous separation membranes 1 was evaluated. The results are shown in Table III.

Air-Leakage Test in Water

A cap as indicated by the sign 6 in FIG. 1 was attached to one end of the separation membrane element 3 produced as described above to close the openings of the hollow-fiber-shaped porous separation membranes 1. Another cap as indicated by the sign 5 in FIG. 1 was attached to the other end, and an air-blowing-in pipe was connected to the outlet of the cap 5. Then, the separation membrane element 3 was immersed in water, and pressurized air was fed into the element 3 from the air-blowing-in pipe. The pressure at which air (bubble) leaked from basal portions of the hollow-fiber-shaped porous separation membranes 1 was measured to evaluate the result by the following criteria.

⊚: Leakage occurred at a pressure of 50 kPa or more

○: Leakage occurred at a pressure of 20 to 50 kPa x: Leakage occurred at a pressure of less than 20 kPa Drawing Test:

One of the hollow-fiber-shaped porous separation membranes 1 of the separation membrane element 3 produced as described above was pinched with the chuck of an instron to draw it from the membrane-sealing portion 2. The drawing force at which the drawing occurred was measured.

Comparative example 1

For comparison, a separation membrane element 3 having a structure in which both ends of the hollow-fiber-shaped porous separation membranes 1 were united with the membrane-sealing portions 2 made of resin was produced through the same method as above, excepting that the steps (2) and (3) in the production of the above-described separation membrane element 3 were not performed. The evaluation of the chemical resistance was conducted through the same method as above. The results are also shown in Table III.

TABLE III

|  |  | Example | | | | | Comparative |
|---|---|---|---|---|---|---|---|
|  |  | 1 | 2 | 3 | 4 | 5 | example 1 |
| Impregnating resin (Hardness) |  | I (60 degrees) | I (60 degrees) | II (40 degrees) | III (35 degrees) | III (35 degrees) | — |
| Sealing resin (Hardness) |  | A (85 degrees) | B (65 degrees) | B (65 degrees) | C (40 degrees) | D (35 degrees) | A (85 degrees) |
| Water-leakage test | i | ○ | ○ | ○ | ○ | ○ | X |
|  | ii | ○ | ○ | ○ | ○ | ○ | X |
|  | iii | ○ | ○ | ○ | ○ | ○ | X |
|  | iv | ○ | ○ | ○ | ○ | ○ | X |
|  | v | ○ | ○ | ○ | ○ | ○ | X |
| Drawing test (N/membrane) | i | 100 or more | 100 or more | 100 or more | 100 or more | 100 or more | At 80, separation membrane broke |
|  | ii | 100 or more | 100 or more | 100 or more | 100 or more | 100 or more | At 80, separation membrane broke |

TABLE III-continued

| | | Example | | | | | Comparative |
|---|---|---|---|---|---|---|---|
| | | 1 | 2 | 3 | 4 | 5 | example 1 |
| | iii | 100 or more | 100 or more | 100 or more | 100 or more | 100 or more | At 80, separation membrane broke |
| | iv | 100 or more | 100 or more | 100 or more | 100 or more | 100 or more | At 80, separation membrane broke |
| | v | 100 or more | 100 or more | 100 or more | 100 or more | 100 or more | At 80, separation membrane broke |

Comparative example 1 was formed by using a sealing resin having a hardness of 85 degrees and caused water leakage in all of the water-leakage tests. Furthermore, in the drawing test, breakage of the hollow-fiber membrane (breakage of the separation membrane) occurred when a drawing force of 80 N was applied. On the other hand, Examples 1 to 5 showed satisfactory results both in the water-leakage test and in the drawing test, proving that breakage of the basal portions and leakage of air or liquid are less likely to occur during the use of the separation membrane module and that the bonding ability between the hollow-fiber-shaped porous separation membranes and the membrane-sealing portions is excellent.

Examples 6 to 8 and Comparative Example 2

First, the thermosetting fluororesins used in the examples and comparative example described below are shown.
Thermosetting Fluororesin 1
A mixture of a thermosetting fluororesin expressed as HOOCCF$_2$[(OCF$_2$CF$_2$)p(OCF$_2$)q]-OCF$_2$COOH (average molecular weight: 1,500) (Fluorolink, made by Solvay Solexis K.K.) and an epoxy resin described below, the mixture containing additionally added 1 weight % tertiary amine (AC399, made by PTI JAPAN LTD.).
  A mixture with a bisphenol F-type epoxy (EPICLON 830, made by DIC Corporation) (in Tables IV to VI, expressed as 1-1)
  A mixture with 1,4-dimethylolphenyldiglycidyl ether (in Tables IV to VI, expressed as 1-2)
  A mixture with polypropylene glycol diglycidyl ether (in Tables IV to VI, expressed as 1-3)
Thermosetting Fluororesin 2
A mixture of a thermosetting fluororesin expressed as HOCF$_2$—[(OCF$_2$CF$_2$)p-(OCF$_2$)q]-OCF$_2$OH (Fluorolink, made by Solvay Solexis K.K.) and MDI at a mol ratio of 1:1 to 1:1.05 (in Tables N to VI, expressed as 2)
Thermosetting Fluororesin 3
A thermosetting fluororesin expressed as XCF$_2$[(OCF$_2$CF$_2$)p-(OCF$_2$)q]-OCF$_2$X (Fluorolink, made by Solvay Solexis K.K.) (in Tables IV to VI, expressed as 3)
Thermosetting Fluororesin 4
A silicone compound having perfluoroalkyl ether, the compound containing an added platinum catalyst (in Tables IV to VI, expressed as 4)

Example 6

Ten PTFE hollow-fiber-shaped porous separation membranes (Poreflon tubes, made by Sumitomo Electric Fine Polymer, Inc.) were prepared that had an outer diameter of 2.3 mm, an inner diameter of 1.1 mm, and a pore diameter of 2 μm. The end portions of the hollow-fiber-shaped porous separation membranes were bundled together and sealed by thermal welding. Under this condition, the end portions are positioned to face downward and set in a mold placed below.

Next, an urethane resin (CORONATE, made by Nippon Polyurethane Industry Co., Ltd., which was produced by reacting polyester-based polyol with isocyanate) heated at 40° C. to reduce the viscosity was cast into a casting mold. After the immersion for 10 minutes, the resin was heated to cure it. This curing formed the main body of the membrane-sealing portion (2c in the example shown in FIG. 5) and sealed the end portions of the hollow-fiber-shaped porous separation membranes. At this moment, the main body had a thickness of 50 mm.

Subsequently, one of the above-described thermosetting fluororesins was applied onto the main-body portion's surface at the side from which the hollow-fiber-shaped porous separation membranes extend. Then, the heating was performed to cure the resin. This curing formed the thermosetting fluororesin layer (2a in the example shown in FIG. 5). Thus, a membrane-sealing portion was obtained that was composed of the main-body portion and the thermosetting fluororesin layer that covered one surface of the main-body portion. The thermosetting fluororesin layer had a thickness of 100 μm. Next, the mold was detached and the membrane-sealing portion of the hollow-fiber-shaped porous separation membranes was subjected to a cutting-away operation at the end side of the hollow-fiber-shaped porous separation membranes. This cutting-away operation opened the end of the hollow-fiber-shaped porous separation membranes to obtain a separation membrane element.

The heating operations for curing the individual thermosetting fluororesins were performed through the following conditions:
  Thermosetting fluororesin 1: after the mixing, it was heated at 100° C. for 4 hours.
  Thermosetting fluororesin 2: after the mixing with MDI, it was heated at 100° C. for 2 hours.
  Thermosetting fluororesin 3: after it was dissolved in isopropyl alcohol and applied in a state of a 10% solution, it was heated at 100° C. for 2 hours.
  Thermosetting fluororesin 4: it was heated at 120° C. for 4 hours to cause addition polymerization.

Comparative Example 2

By forming the main-body portion through the same method as used in Example 6, the membrane-sealing portion was formed to seal the end portions of the hollow-fiber-shaped porous separation membranes. At this moment, the membrane-sealing portion had a thickness of 50 mm. The application of a thermosetting fluororesin onto the surface of the membrane-sealing portion and the curing of it were not performed. Next, the mold was detached and the portions protruding from the membrane-sealing portion of the hollowfiber-shaped porous separation membranes were cut to obtain a separation membrane element.

Example 7

As with Example 6, the main-body portion of the membrane-sealing portion (2c in the example shown in FIG. 6) to seal the end portions of the hollow-fiber-shaped porous separation membranes. Next, the mold was detached and as with Example 6, openings of the end portions of the hollow-fiber-shaped porous separation membranes were formed to obtain a separation membrane element.

Subsequently, one of the above-described thermosetting fluororesins was applied onto both surfaces of the above-described main-body portion. Then, the heating for curing the resin were performed to form thermosetting fluororesin layers (2a and 2b in the example shown in FIG. 6). Thus, a membrane-sealing portion was obtained that was composed of the main-body portion and the thermosetting fluororesin layers that covered both surfaces of the main-body portion. Each of the thermosetting fluororesin layers on both surfaces had a thickness of 100 μm. The conditions of the heating for curing the individual thermosetting fluororesins were also the same as those of Example 6.

Example 8

The hollow-fiber-shaped porous separation membranes used in Example 6 were set in a mold by the same manner as used in Example 6. Next, the above-described thermosetting fluororesin (when required, liquefaction was conducted under the condition described below) was cast in a mold and heated to cure it. This operation formed a membrane-sealing portion (2 in the example shown in FIG. 7) to seal the end portions of the hollow-fiber-shaped porous separation membranes. Then, the mold was detached and the membrane-sealing portion of the hollow-fiber-shaped porous separation membranes was subjected to a cutting-away operation at the end side of the hollow-fiber-shaped porous separation membranes. This cutting-away operation opened the end of the hollow-fiber-shaped porous separation membranes to obtain a separation membrane element.

The heating operations for curing the individual thermosetting fluororesins were conducted under the same conditions as those in Example 6.

Evaluation of Chemical Resistance

The separation membrane elements produced in Examples 6 to 8 and Comparative example 2 were immersed for 500 hours in each of the chemical agents (i) to (v) shown below. Under this condition, whether or not leakage occurs due to the development of a crack between the membrane-sealing portion and the end portions of the hollow-fiber-shaped porous separation membranes caused by the deterioration of the membrane-sealing portion was evaluated by the water-leakage test. The results are shown in Tables IV to VI. In each of the tables, the description in the row indicated by "resin" shows the type of thermosetting fluororesin. In the tables, "○" denotes that no leakage occurred and "×" denotes that leakage occurred.

Liquids of chemical agents: (i) a 4% sulfuric acid aqueous solution, (ii) a 4% sodium hydroxide aqueous solution, (iii) a sodium hypochlorite aqueous solution equivalent to 3,000 ppm of effective chlorine, (iv) isopropyl alcohol, and (v) methyl ethyl ketone.

TABLE IV

| Resin | Example 6 | | | | | | Comparative example 2 |
|---|---|---|---|---|---|---|---|
| | 1-1 | 1-2 | 1-3 | 2 | 3 | 4 | — |
| (i)   | ○ | ○ | ○ | ○ | ○ | ○ | X |
| (ii)  | ○ | ○ | ○ | ○ | ○ | ○ | X |
| (iii) | ○ | ○ | ○ | ○ | ○ | ○ | X |
| (iv)  | ○ | ○ | ○ | ○ | ○ | ○ | X |
| (v)   | ○ | ○ | ○ | ○ | ○ | ○ | X |

TABLE V

| Resin | Example 7 | | | | | |
|---|---|---|---|---|---|---|
| | 1-1 | 1-2 | 1-3 | 2 | 3 | 4 |
| (i)   | ○ | ○ | ○ | ○ | ○ | ○ |
| (ii)  | ○ | ○ | ○ | ○ | ○ | ○ |
| (iii) | ○ | ○ | ○ | ○ | ○ | ○ |
| (iv)  | ○ | ○ | ○ | ○ | ○ | ○ |
| (v)   | ○ | ○ | ○ | ○ | ○ | ○ |

TABLE VI

| Resin | Example 8 | | | | | |
|---|---|---|---|---|---|---|
| | 1-1 | 1-2 | 1-3 | 2 | 3 | 4 |
| (i)   | ○ | ○ | ○ | ○ | ○ | ○ |
| (ii)  | ○ | ○ | ○ | ○ | ○ | ○ |
| (iii) | ○ | ○ | ○ | ○ | ○ | ○ |
| (iv)  | ○ | ○ | ○ | ○ | ○ | ○ |
| (v)   | ○ | ○ | ○ | ○ | ○ | ○ |

As is evident from the results shown in Tables IV to VI, the separation membrane elements in Examples 6 to 8, in which in the membrane-sealing portion, at least the surface that was to be in contact with the liquid of a chemical agent was formed of a thermosetting fluororesin, showed excellent chemical resistance in that no cracking or liquid leakage occurred at the membrane-sealing portion even when it was immersed in the above-described chemical agents for 500 hours. On the other hand, the separation membrane element in Comparative example 2, in which the membrane-sealing portion was formed only of an urethane resin, showed inferior chemical resistance in that cracking and liquid leakage occurred at the membrane-sealing portion when it was immersed in the above-described chemical agents.

The invention claimed is:

1. A separation membrane element, comprising a plurality of hollow-fiber-shaped porous separation membranes and a membrane-sealing portion that bundles end portions of the hollow-fiber-shaped porous separation membranes together to seal the end portions; wherein in the membrane-sealing portion, at least the surface at a side that is to be in contact with a liquid to be treated is formed of a thermosetting fluororesin, wherein the hollow-fiber-shaped porous separation membranes are formed of a fluororesin.

2. The separation membrane element as defined by claim 1, wherein in the membrane-sealing portion, the surface at a side at which openings of the hollow-fiber-shaped porous separation membranes are located is further formed of a thermosetting fluororesin.

3. A separation membrane module, comprising the separation membrane element as defined by claim 1, and a housing that houses the separation membrane element;

wherein the separation membrane element is united with the housing.

4. A method of producing a separation membrane element comprising a plurality of hollow-fiber-shaped porous separation membranes and a membrane-sealing portion that bundles end portions of the hollow-fiber-shaped porous separation membranes together to seal the end portions, the method comprising the steps of:
(a) bundling end portions of the multiple hollow-fiber-shaped porous separation membranes together to set the end portions in a mold;
(b) casting a thermosetting resin, which is uncured, into the mold;
(c) after the casting, curing the thermosetting resin to seal the end portions of the hollow-fiber-shaped porous separation membranes;
(d) in the thermosetting resin, which has been cured, applying a thermosetting fluororesin, which is uncured, onto at least the surface at a side from which the hollow-fiber-shaped porous separation membranes extend;
(e) after the applying, curing the thermosetting fluororesin; and
(f) removing the thermosetting resin, which has been cured, from the mold and performing a cutting-away operation at the end-portion side of the hollow-fiber-shaped porous separation membranes to form openings of the hollow-fiber-shaped porous separation membranes, wherein the hollow-fiber-shaped porous separation membranes are formed of a fluororesin.

5. The method of producing a separation membrane element as defined by claim 4, wherein after the openings of the hollow-fiber-shaped porous separation membranes are formed, a thermosetting fluororesin is further applied onto the cured thermosetting resin's surface at a side where the openings of the hollow-fiber-shaped porous separation membranes are located and the applied thermosetting fluororesin is cured.

6. The method of producing a separation membrane element as defined by claim 4, wherein the thermosetting fluororesin is a composite comprising:
(a) a perfluoropolyoxyalkane dicarboxylic acid expressed as the formula $HOOCCF_2[(OCF_2CF_2)p\text{-}(OCF_2)q]\text{-}OCF_2COOH$ (in the formula, p=2 to 20, and q=2 to 20) or its derivative; and
(b) a multifunctional compound that condensation-polymerizes with the perfluoropolyoxyalkane dicarboxylic acid or its derivative.

7. The method of producing a separation membrane element as defined by claim 4, wherein the thermosetting fluororesin comprises:
(a) a perfluoropolyoxyalkane dihydroxy expressed as the formula $HOCF_2\text{—}[(OCF_2CF_2)p\text{-}(OCF_2)q]\text{-}OCF_2OH$ (in the formula, p=2 to 20, and q=2 to 20) or its derivative; and
(b) a multifunctional compound that condensation-polymerizes with the perfluoropolyoxyalkane dihydroxy or its derivative.

8. The method of producing a separation membrane element as defined by claim 4, wherein the thermosetting fluororesin comprises a perfluoropolyoxyalkane having a silane functional group at the ends of the formula expressed as $XCF_2\text{—}[(OCF_2CF_2)p\text{-}(OCF_2)q]\text{-}OCF_2X$ (in the formula, X denotes a silane functional group, p=2 to 20, and q=2 to 20).

9. The method of producing a separation membrane element as defined by claim 4, wherein the thermosetting fluororesin comprises a silicone compound that has perfluoroalkyl ethers and that is expressed by formula (I) below:

[Chemistry 1]

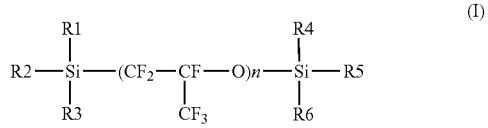

(in the formula, n=2 to 50; R1, R2, R3, R4, R5, and R6 are each an alkyl group or an alkenyl group; and at least one group among R1, R2, and R3 and at least one group among R4, R5, and R6 are each an alkenyl group).

10. A method of producing a separation membrane element comprising a plurality of hollow-fiber-shaped porous separation membranes and a membrane-sealing portion that bundles end portions of the hollow-fiber-shaped porous separation membranes together to seal the end portions, the method comprising the steps of:
(a) bundling end portions of the multiple hollow-fiber-shaped porous separation membranes together to set the end portions in a mold;
(b) casting a thermosetting fluororesin, which is uncured, into the mold;
(c) after the casting, curing the thermosetting fluororesin to seal the end portions of the hollow-fiber-shaped porous separation membranes; and
(d) removing the thermosetting fluororesin, which has been cured, from the mold and performing a cutting-away operation at the end-portion side of the hollow-fiber-shaped porous separation membranes to form openings of the hollow-fiber-shaped porous separation membranes, wherein the hollow-fiber-shaped porous separation membranes are formed of a fluororesin.

11. The method of producing a separation membrane element as defined by claim 10, wherein the thermosetting fluororesin is a composite comprising:
(a) a perfluoropolyoxyalkane dicarboxylic acid expressed as the formula $HOOCCF_2[(OCF_2CF_2)p\text{-}(OCF_2)q]\text{-}OCF_2COOH$ (in the formula, p=2 to 20, and q=2 to 20) or its derivative; and
(b) a multifunctional compound that condensation-polymerizes with the perfluoropolyoxyalkane dicarboxylic acid or its derivative.

12. The method of producing a separation membrane element as defined by claim 10, wherein the thermosetting fluororesin comprises:
(a) a perfluoropolyoxyalkane dihydroxy expressed as the formula $HOCF_2\text{—}[(OCF_2CF_2)p\text{-}(OCF_2)q]\text{-}OCF_2OH$ (in the formula, p=2 to 20, and q=2 to 20) or its derivative; and
(b) a multifunctional compound that condensation-polymerizes with the perfluoropolyoxyalkane dihydroxy or its derivative.

13. The method of producing a separation membrane element as defined by claim 10, wherein the thermosetting fluororesin comprises a perfluoropolyoxyalkane having a silane functional group at the ends of the formula expressed as $XCF_2\text{—}[(OCF_2CF_2)p\text{-}(OCF_2)q]\text{-}OCF_2X$ (in the formula, X denotes a silane functional group, p=2 to 20, and q=2 to 20).

14. The method of producing a separation membrane element as defined by claim 10, wherein the thermosetting fluororesin comprises a silicone compound that has perfluoroalkyl ethers and that is expressed by formula (I) below:

[Chemistry 1]
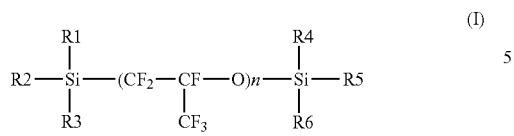
(in the formula, n=2 to 50; R1, R2, R3, R4, R5, and R6 are each an alkyl group or an alkenyl group; and at least one group among R1, R2, and R3 and at least one group among R4, R5, and R6 are each an alkenyl group).
* * * * *